Nov. 24, 1959     E. J. SWEENY, JR     2,914,016
AUTOMOBILE POWERED WATERCRAFT
Filed Aug. 29, 1956     4 Sheets-Sheet 3
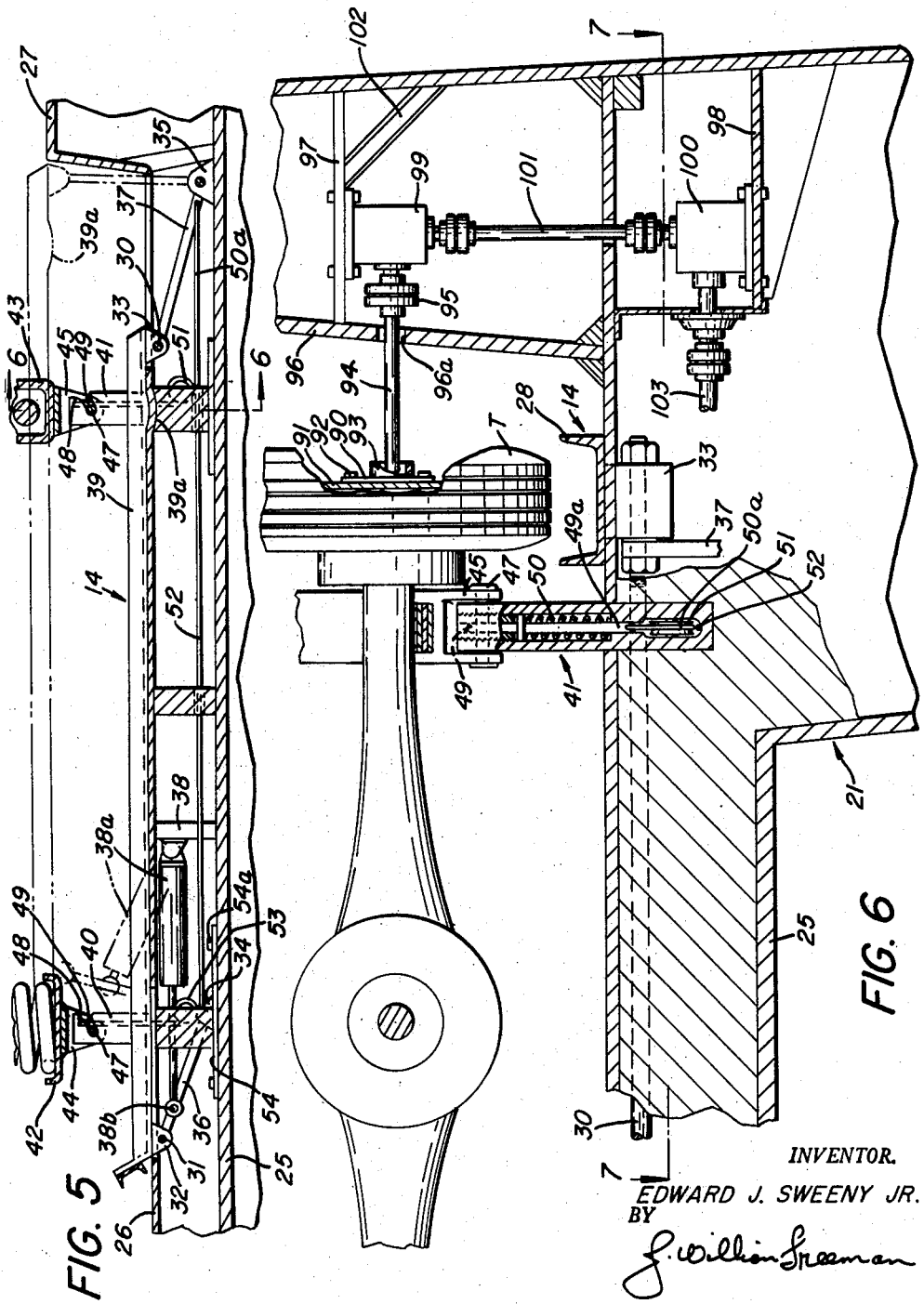
INVENTOR.
EDWARD J. SWEENY JR.

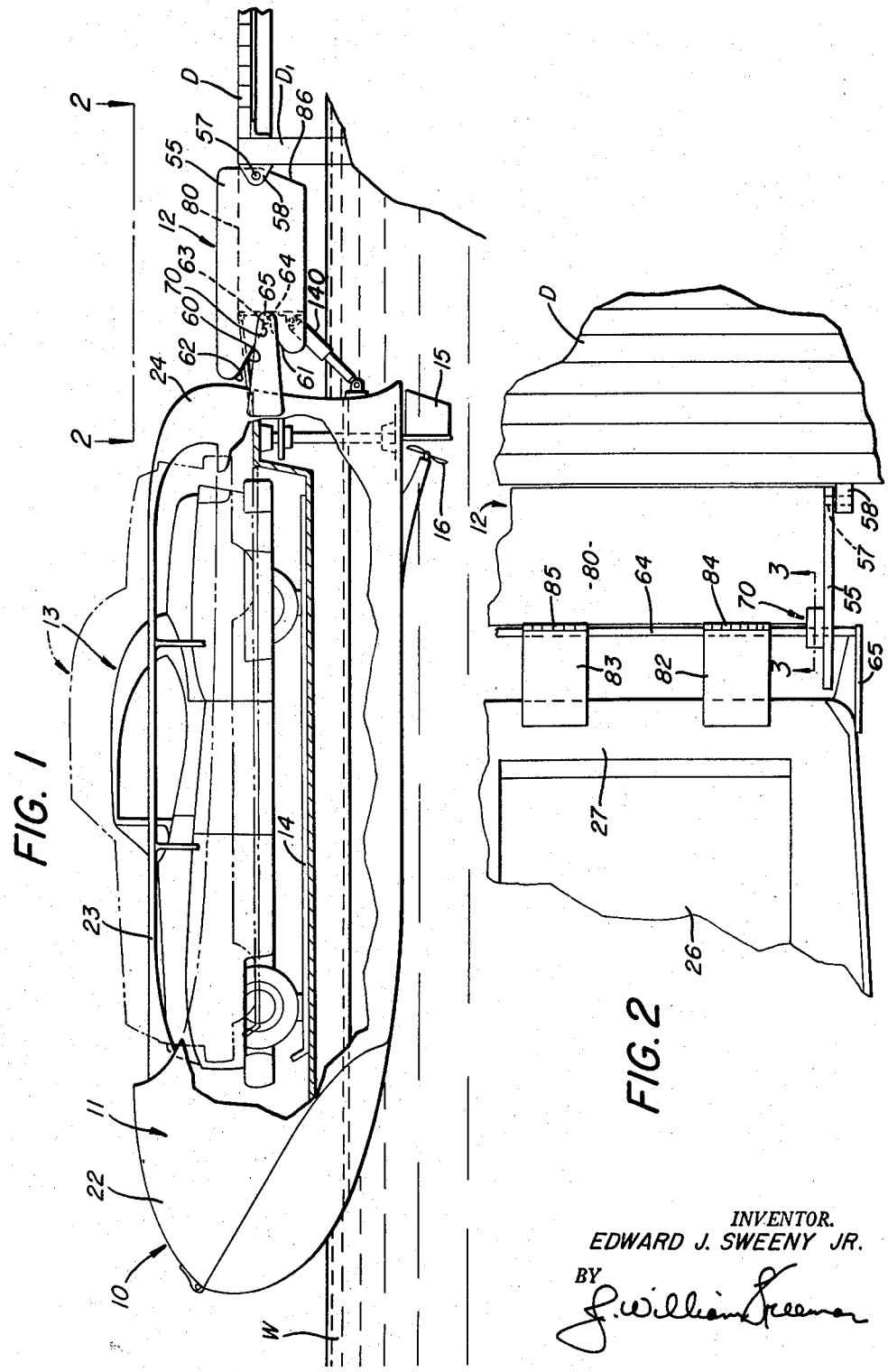

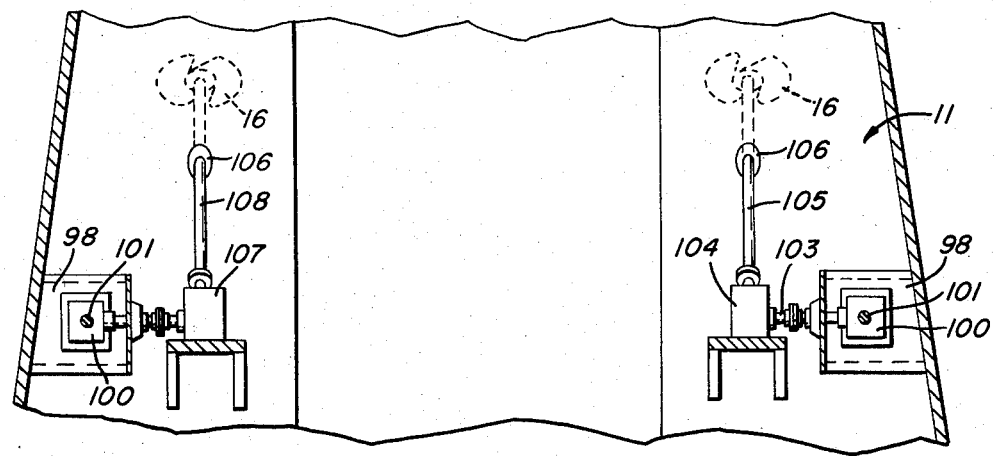
FIG. 7
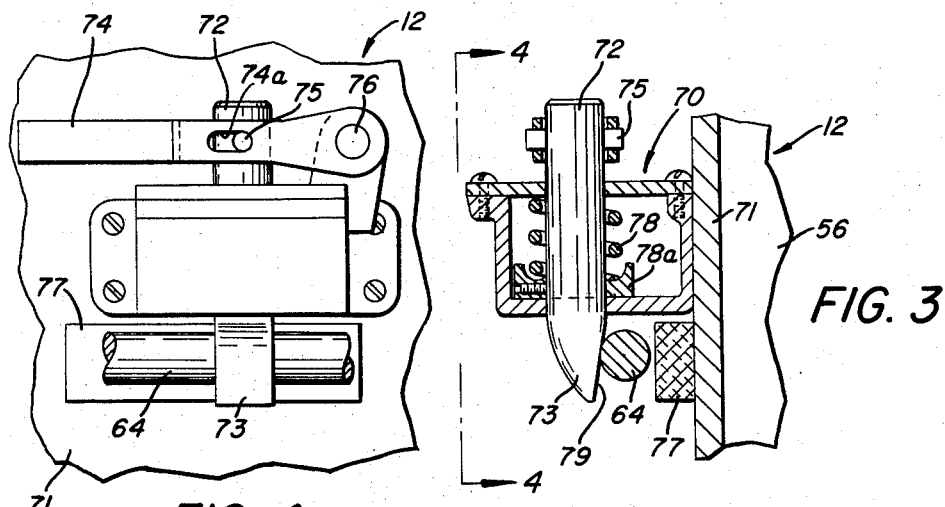
FIG. 4
FIG. 3
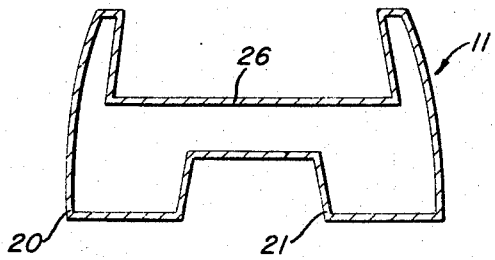
FIG. 10
INVENTOR.
EDWARD J. SWEENY JR.

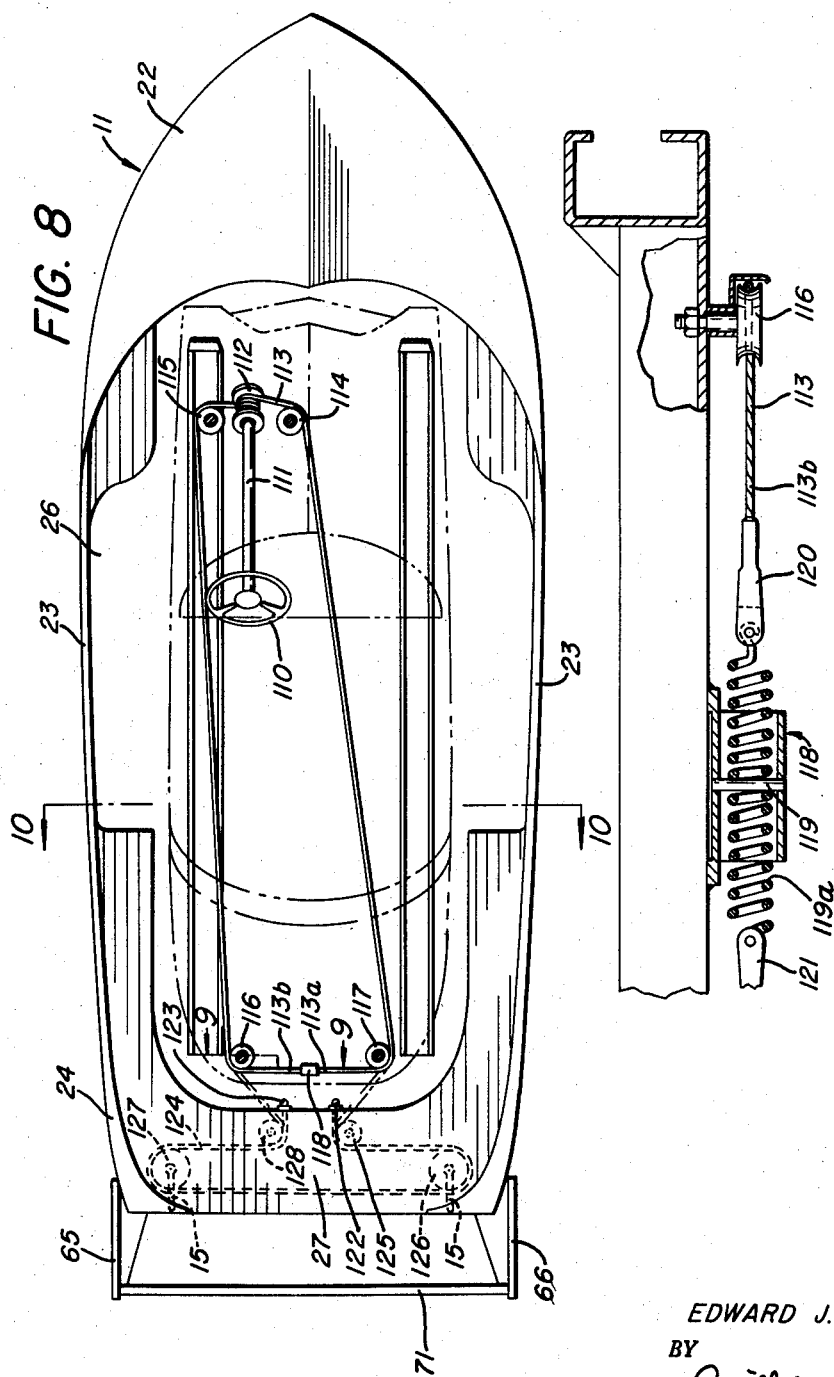

United States Patent Office 2,914,016
Patented Nov. 24, 1959

2,914,016
AUTOMOBILE POWERED WATERCRAFT
Edward J. Sweeny, Jr., Cleveland Heights, Ohio Application August 29, 1956, Serial No. 606,860

11 Claims. (Cl. 115—.5)

This invention relates to the art of watercraft, and in particular relates to improvements in watercraft that are adapted to receive an automobile thereon, with propulsion and steerage of the watercraft being accomplished as a result of the driving connection between the watercraft and the automobile received thereon.

In the past, attempts at providing watercraft of this general character have been made. Typical of such prior art devices is the device set forth in Cook Patent 1,495,-726, where a watercraft having an automobile received thereon is shown with the watercraft being propelled by the driving wheels of the automobile.

Typical of such disadvantages now existing in the prior art is the difficulty encountered when it is attempted to either drive the automobile on to, or off of, the boat or watercraft in question. Because this operation of driving the car on or off the boat involves the application of high-load forces at one end thereof, it has been necessary in the past that the watercraft be landed at a shore where a ramp in the forward portion of the watercraft can be opened up so as to permit discharge of the automobile with respect to the watercraft.

As a practical matter, however, the above disadvantage precludes the use of such watercraft in places where proper shore line is not available and in this regard, would completely preclude the use of such craft in connection with docks or other shore installations where a permanent pier has been erected for permitting discharge and entry of passengers with respect to a boat or other vessel. As a further disadvantage, when it is required, as the case in the prior art, to load and unload the auto in shallow water, this oftentimes results in damage to the propeller means of the watercraft due to the extreme shallowness of the water.

In addition to the aforementioned disadvantages, the known type of prior art watercraft of this general nature have been characterized by the defect that the same were not capable of accommodating automobiles of different sizes. Thus, each watercraft was required to be precision made for one type make and model of automobile with the result that the autos could not be inter-changed to permit wide usage of the device. Also, as indicated above, the prior art is completely devoid of any devices whatsoever for mooring a watercraft of the general nature above described in deep water and effectuating the removal or entrance of the car in several feet of water, for example.

Provision of an automobile propelled watercraft overcoming the aforementioned disadvantages accordingly becomes the principal object of this invention.

It is also a further object of this invention to provide a watercraft designed for propulsion by an automobile received thereon, and being characterized by the fact that the entry and discharge of the automobile with respect to the craft can be effectuated in deep water.

It is a still further object of this invention to provide a watercraft of the character above described, characterized by the use of improved loading means for positioning the automobile with respect thereto, and further characterized by the fact that the same is designed to accommodate a wide range of automobiles having different length wheel bases.

It is the still further object of this invention to provide a watercraft of the character above-described that is simple in construction and is capable of heavy duty usage by a wide range of vehicles.

These and other objects of the invention will become more apparent upon a reading of the following brief specification considered and interpreted in the light of the accompanying drawings.

Figure 1 is a side elevation partly broken away and in section, and illustrating in full and chain-dotted lines, an automobile received upon the improved watercraft.

Figure 2 is a plan view taken on the lines 2, 2 of Figure 1.

Figure 3 is a sectional view taken on the lines 3, 3 of Figure 2.

Figure 4 is an elevation view taken on the lines 4, 4 of Figure 3.

Figure 5 is a partial vertical section similar to Figure 1, but showing in greater detail the structure of the improved loading ramp.

Figure 6 is a sectional view taken on the lines 6, 6 of Figure 5.

Figure 7 is a view taken on the lines 7, 7 of Figure 6.

Figure 8 is a plan view partly broken away and in section and illustrating the automobile in phantom lines.

Figure 9 is a view taken on the lines 9, 9 of Figure 8.

Figure 10 is a sectional view through the hull taken on the lines 10, 10 of Figure 8.

Referring now to the drawings, and in particular to Figure 1 thereof, the improved watercraft, generally designated by the numeral 10, is shown floating in water W adjacent a dock D, and includes a hull 11, that is secured at its stern to a mooring ramp 12 to thus facilitate loading and unloading of an automobile 13 with respect to the hull 11 upon movement of a supporting frame 14 between the full and chain-dotted line positions of Figure 1, with steerage through rudder 15, and propulsion through propeller 16 being effectuated upon coaction between component parts of the hull 11 and the automobile 13 as will presently be described.

In order that the structure of the water craft might be more thoroughly understood, the hull and loading ramp will be described separately as will mooring ramp 12, the propulsion means and the steering means. Additionally, the operation of the overall device will be separately described.

Hull and loading ramp

As is best shown in Figures 1, 8 and 10 of the drawings, the hull employed in the preferred embodiment of the invention is of the displacement type and may, if desired, be of the catamaran type as shown in Figure 10 wherein twin displacement hulls 20 and 21 are provided for the purposes of giving buoyancy to the overall hull 11. It is to be understood that the specific shape or design of the hull is not critical to the invention recited herein, and accordingly, the preferred species of the invention illustrates, as shown in Figure 1, a decking 22 that covers a bow portion of the hull 11 while side rails 23, 23 extend rearwardly to the stern 24 of the boat for the purpose of providing a degree of safety to passengers thereof. It is to be understood in this regard, although not shown, the hull 11 is provided with the usual bulkheads and longitudinal stringers that add rigidity to the same and permit load carrying qualities to be imparted thereto.

To this end, as is best shown in Figure 5, the hull 11 includes a horizontal sub-deck 25 as well as spaced horizontal deck 26 that is raised slightly therefrom for purposes to be described. Similarly, the rear of the watercraft is shown provided with a horizontal decking 27 across which the wheels of the automobile may be driven when the ramp 14 is in the chain-dotted line position of Figure 5 of the drawings.

Considering next the structure of the ramp 14, the same includes elongate tracks 28, 28 that extend longitudinally of hull 11 in parallel and which are interconnected at their longitudinal ends by tie rods 30, 31, the arrangement being such that these members 28, 28, 30 and 31 define the rectangular shaped ramp that has been indicated by the numeral 14.

To the end of shifting the ramp 14 between the full and chain dotted line positions of Figure 5, each track 28 has depending lugs 32 and 33 provided at the front and rear ends thereof, with similar lugs 34 and 35 being provided on the deck 25 so that each set of lugs 32 and 34 can be connected by a link arm 36, while the lugs 33 and 35 can be connected by a link arm 37.

In this manner, pivotal movement of links 36, 37, around lugs 34, 35, will result in the entire ramp being raised or lowered as a unit with tracks 28, 28 always being in parallel with each other and with the decks 25, 26 and 27 during such movement.

To the end of actuating the just-described movement linkage between the full and chain-dotted line position of Figure 5, a bulkhead 38 is shown pivotally receiving a servo-motor 38a, the free end of which is pivotally attached as at 38b, to the link arm 36. In this manner, expansion of the servo-motor 38a to the full-line position of Figure 5 results in collapsing of the parallelogram linkage to the full-line position of Figure 5 with the frame 14 being substantially in coplanar abutment with the deck portion 26 and also being in spaced parallel relationship with respect to the lower sub-deck 25. In this manner, a free and positive frame is provided that is capable of being moved between the full and chain-dotted line positions of Figure 5 upon actuation of the servo-motor 38a with the chain dotted line positions of such movement being shown in Figure 5 of the drawings. In this regard, it is to be understood that appropriate slots are provided in the deck 26 for the purpose of providing clearance of the lug members and attached link arms that depend from the tracks 28, 28. It is also to be understood that guide rails 39, 39 may be provided on tracks 28, 28 for guiding the car when the same is driven onto the ramp 14 and additionally each track 28 may include an arcuate depression 39a within which the rear tires of the car may be received to insure proper positioning of the same with respect to the driving mechanism as will be presently described.

In order to provide a positive attachment between the automobile 13 and the hull 11 during operation of the watercraft 10, the preferred embodiment of the invention contemplates direct attachment between automobile and hull, and to this end the deck 25 is shown as including upright standards with only the front and rear standards 40 and 41 that are adjacent one track 28, being shown in the drawings.

These standards are, in the preferred embodiment of the invention, of similar construction, with the front set of transversely spaced standards 40—40 being adapted to receive transversely spaced lugs 44, 44 that are provided on the front cross tie member 42 of the car, while rear set of spaced standards 41, 41 received spaced lugs 45, 45 that depend from rear axle 43 of car 13. In this regard, it is to be understood that the car is received on the standards so as to take advantage of the car springs with attachment to any desired location being available upon proper placement of the lugs either with respect to the front or rear portions of the car. Because these lugs are similar in construction, only lug 45 is shown in Figure 6 of the drawings, it being understood that the remaining lugs are all similar and are attached to their respective frame members as welding at 46. Accordingly, each lug 44, 45 is of U-shaped configuration and includes a pin 47 that extends between the spaced legs thereof; the arrangement being such that the legs of each lug 44, 45, will span the respective standards 40, 41, and the individual pins 47, 47 thereof will be received in inclined slots 48, 48 that are provided at the upper end of each standard 40, 41.

To eliminate shifting of the car 13 with respect to hull 11, the just-described pins 47, 47 are shown retained within the respective slots 48, 48 by use of a series of retractable pins 49, 49 with each pin 48 being spring-loaded by spring 50 to normally close the slots 48, 48. To effectuate retraction of the pins 49, 49, the same are attached at ends 49a, 49a to a series of rope members that are played about pulleys for eventual attachment to the rear link arms 37, 37, with cable 50a being shown played over pulley 51 while cable 52 is played over pulley 53 to effectuate operation of pins 49, 49 that are provided in standards 40 and 41 respectively (see Figure 5). In this manner, the auto frame will be firmly fixed with respect to the hull per se, and displacement thereof will not be possible notwithstanding rough weather or other inclement conditions of usage. It is believed apparent that during the unloading operation that upon movement of the ramp 14 upwardly and to the right of Figure 5 of the drawings, that the cables 50a and 52 will be moved to the right of Figure 5 with the result that pins 49, 49 in standards 40 and 41 will be retracted and the slots 48, 48 thereof opened to permit the pin 47, 47 to be removed with respect to the same.

Also, to permit adjustment, the front standard 40, shown mounted on racks 54, 54, so as to be adjustable longitudinally of deck 25 with attachment and adjustment being facilitated by use of pins 54a, 54a, for example.

The mooring ramp

The mooring ramp mechanism, generally designated by the numeral 12, is best shown in Figures 1 through 4 of the drawings, and accordingly, the same is shown therein as being pivotally suspended with respect to both the dock D and the stern 24 of the watercraft 10, so as to permit the effectuating of the loading and unloading action, as will be described.

To this end, the opposed side frame members 55, 55 of ramp 12 are shown pivotally secured by pins 57, 57, to lug members 58, 58 that are secured to the dock member D as is clearly shown in Figure 1 of the drawings.

In addition to the aforementioned component structure, each side member 55 has a mouth opening generally designated by the numeral 60 that is defined by divergent side portions 61 and 62 that come together to define a slot 63. Receivable within this slot 63 is a rod member 64 that interconnects transversely spaced guard members 65 and 66 (see Figure 8) provided on the stern portion of the watercraft 10 and projecting rearwardly thereof.

To the end of securing the stern portion 24 of hull 11 with respect to the mooring ramp 12, the rod 64 is shown in Figure 1 as being suspended rearwardly of hull 11 by being interconnected between the rearwardly extending arms 65 and 66 with a lock member indicated generally in Figure 1 of the drawings by the numeral 70, being used to retain the rod 64 with respect to the ramp 12. Accordingly, this lock member 70, as best shown in Figures 3 and 4, is shown mounted upon a transversely extending plate member 71 that interconnects the side frame members 55, 55 of the mooring ramp 12. While various types of locking arrangements could be employed in this regard, the preferred embodiment of the invention herein disclosed contemplates the use of a vertically (Figure 3) shiftable pin 72 having its lower end 73 engaged about the pin 64 as shown in Figure 3 of the drawings. This pin 72 is shown reciprocated vertically by use of a handle 74 that attaches with respect to pin 72 as a result of the connection between connecting pin 75 and slot 74a with pivotal movement being around the pivotal point 76 as is best shown in Figure 4 of the drawings. A spring 78, normally urges the pin 12 into the down position of Figure 3 as a result of the action of the spring against the collar member 78a. A block 77 of cushioning material is provided on the wall member 71 for the purpose of eliminating marring or other damage thereto, while the front or leading edge surface of the lower portion 73 is contoured as at 79 to permit the pin 72 to be raised upwardly to permit positioning of the pin member 64 as shown in Figure 3 of the drawings.

It will be seen from the above that the mooring rack 12 is in actuality, pivoted around the pivot point 57 of the dock D and the pivot pin 64, and accordingly, upward or downward movement of the hull 11 during the loading operation will result in the car-receiving surface 80 (see Figure 2) thereof always being maintained in alignment with the car-receiving surface 27 that is provided on the stern portion 24 of the hull 11.

Also, as shown in Figure 2, a gap or spacing exists between the ramp 12 and the stern portion 24 of hull 11 to accommodate this pivotal movement that occurs during rough weather, for example. Accordingly, for the purpose of bridging this gap, there is shown in Figure 2 a pair of plate members 82 and 83 that are hinged as at 84 and 85 respectively so as to connect the surfaces 80 and 27 of the ramp 12 and hull 11 respectively. Similarly, the end portion of each side member 55, 55 adjacent the dock D, is shown undercut as at 86 to facilitate a pivotal movement with the degree of such pivotal movement around the pin 57 being terminated upon contact between the surface 86 and the dock support $D_1$ as shown in Figure 1 of the drawings.

The propulsion means

It has been previously indicated that the watercraft 10 is driven as a result of a driving connection between the automobile wheels T and the propeller members 16, 16 that project rearwardly of the hull 11 adjacent the stern portion thereof. In Figures 6 and 7 of the drawings, the detailed embodiment of the mechanism employed to effectuate such a driving connection is shown in greater detail.

Accordingly, the wheel T shown in Figure 6 of the drawings is shown partially broken away to illustrate a plate 90 that is received against the ordinary plate 91 of the automobile wheel, the plate 90 being appropriately apertured to be received over the stud bolts 92, 92 provided in such wheel plate 91. The plate 90 also includes a universal type connection indicated by the numeral 93, from which projects a shaft 94, the opposed end of which connects with a coupling 95 shown in Figure 6 of the drawings, with a shaft 94 having clearance with respect to the wall 96 of the hull 11 as a result of slot 96a being provided therein. In this manner, the shaft 94 may have its axis of rotation changed to accommodate different sizes of cars with the universal connection 93 and the coupling 95 facilitating a flexible shaft-type connection. The frame 96 also includes additional supporting structure in the form of horizontal frame members 97 and 98 that respectively receive gear reduction boxes 99 and 100 thereon, with these gear reduction boxes being interconnected by shaft member 101 as best shown in Figure 6 of the drawings. Additional supports in the form of tie members, such as the tie member 102, could be provided where required for purposes of giving additional support to the component parts above described.

Projecting out of the gear box 100 is a shaft member 103 that, as shown in Figure 7 of the drawings, leads into a gear box 104, the output spindle 105 of which passes through a watertight seal 106 provided in the hull 11 so as to connect with the one propeller 16. A similar driving connection may be made with the other wheel (not shown) so as to cause rotation through gear box 107 of the remaining propeller 16 with this rotation occurring as a result of the connection between propeller 16 and shaft 108.

In this manner, it is believed apparent that rotation of the tires T, T will result in equivalent rotation of shaft members 105, 108, with the result that the propellers 16, 16 will also be rotated, with reversal of wheel direction resulting in reversal of propeller rotation to permit backing up of the hull 11 upon changing gears in car 13. It is believed apparent that the usual reduction gears can be employed to attain proper propeller speed and also that a single propeller type device could be obtained simply by using one wheel as a driving source.

The steering mechanism

The steering mechanism that effectuates movement of the rudder 15 of Figure 1 of the drawings, is best shown in detail in Figures 8 and 9 of the drawings where an automobile (shown in phantom lines in Figure 8) is received upon the hull 11 with the steering mechanism and the operation thereof being illustrated in full lines for the sake of clarity.

Accordingly, the steering wheel 110 of the automobile is shown having the lower end 111 thereof provided with a drum 112 about which is played a cable member 113 that is, in turn played about pulleys 114, 115, 116, and 117; the arrangement being such that the free ends 113a and 113b of the cable 113 are shown connected by a connector 118, the detailed construction of which is best shown in Figure 9 of the drawings. This arrangement is made so that the steering mechanism for the hull 11 can be maintained intact on the car 13 during a period of non-use. Accordingly, the connector 118 is shown having a pin 119 which locates and spaces spring 119a, the opposed ends of which are connected to connector members provided on the free ends of the rope 113 at the end portions 113a and 113b thereof. These connectors, given the numerals 120 and 121 in Figure 9 of the drawings, are also adapted to be connected to the ends 122 and 123 of the rope member 124 that operates the steering mechanism as a result of being played around idler rolls 125, 126, 127, and 128 with the rudder members 15, 15 being shown actuated by idler rolls 126 and 127.

In this manner, the hook members 122 and 123 can easily be attached to connectors 121 and 120, respectively, so that rotation of the steering wheel 110 will result in equivalent movement of the rudder members 15, 15.

It is, of course, to be understood that if desired in this regard, a more simplified type of steering arrangement could be provided wherein brackets, not shown, are operatively associated with the front tire members, which, in this preferred embodiment of the invention, are suspended with respect to the deck 26, and accordingly, can be freely turned. In this manner, rotation of the front tires which would accordingly transmit this motion to the rudder through a series of cables and pulleys not shown herein for the sake of clarity.

Operation of the device

In use or operation of the improved watercraft 10, it will first be assumed that the same has been positioned in the water adjacent the dock D and that the mooring ramp has been operatively associated with respect to the stern portion 24 of the hull 11 as a result of the pin 64 being locked in place by the lock mechanism 70. At this time, the loading surface 80 of the ramp member 12 will be in substantial parallelism with respect to the surface 27 at the stern of the hull 11, and at this point, the spanning members 82 and 83 can be moved about their hinge points 84 and 85 so as to span the gap existing between the hull 11 and the mooring ramp 12.

At this time, the servo-motor 38 will be contracted so as to cause the link members 36, 37 to move clockwise about their pivot points and thus cause the frame member 14 to be moved to the chain-dotted line position shown in Figure 5 of the drawings. At this time, the frame member 14 will be in the same horizontal plane as the surface 27 at the stern of the craft, and accordingly, the automobile may be driven across the surface 80, 82, 83 and 27 onto the frame member 14.

With the auto wheels T, T resting on the frame member 14 in the manner just described and with the rear wheels resting in depression 39a the servo-motor 38a may be moved in the reverse direction and the members 36, 37 moved counter-clockwise of Figure 5 towards the full-line position thereof. During this downward and to the left movement in Figure 5 of the drawings, it is believed apparent that the pin members 47, 47 that are provided on the various lugs 44, 45, will engage with the slots 48, 48 provided upon the upright standards 40, 41. As a result of the pin members 47, 47 entering the just described slots, the frame member 14 will continue on without the wheels received thereon and will finally rest in place with respect to the deck 26 as is clearly shown in Figures 5 and 6 of the drawings, with the automobile 13 being suspended with respect to the deck 26 as a result of being received in the slots as just described.

In order that these pins 47, 47 may be locked within the slots, it is believed apparent that the springs 50, 50 will urge the plunger rod 49, 49 upwardly of Figure 5 so that the same will close off the gap and thus the automobile will be firmly in position and tied with respect to the hull 11, with such movement occurring upon movement of cables 50 and 52 that are tied to the link arms as has been previously described.

At this point the hub caps of the rear wheels may be removed and the nuts provided on the stud bolts 92, 92 removed at which time the plate 90 may be positioned thereon and the nuts replaced upon the stud bolts 92 to obtain the driving connection shown in Figure 6 of the drawings with both rear wheels being so connected.

Similarly, at this time, the connector 118, which has been tied together on the car 13 as shown in Figure 8 of the drawings may be disassembled and the connector members 120 and 121 attached to the free ends 122 and 123 of the rope member 124 with such action operating to move the steering mechanism into operation whereby rotation of the steering wheel 110 will be transmitted to the rudder members 15, 15.

Suitable flexible conduit may be attached at this point to the exhaust of the car in order to assure that the same is transmitted rearwardly and exteriorly of the hull 11 through an appropriate opening. At this time, with the car fully locked in position with respect to the hull and the steering and propulsion apparatus connected, the lock member 70 may be released by merely raising the handle 74 and at this time the car engine started and the car placed in gear to cause rotation of the wheels T in a forward direction. With such initiation of rotation of the wheels T, T, the equivalent rotation of the propellers 16, 16 will occur with the result that the watercraft, with the car received thereon, will slowly be released with respect to the mooring ramp 12 and the watercraft will be free thereof and may be operated during its course of movement by merely operating the accelerator and steering mechanism of the automobile, with steering being effectuated by the turning of the steering wheel and increased acceleration or changed directional movement being accomplished by increase of pressure on the car accelerator or shifting of the gears to change direction of rotation of the rear wheels of the car. The car brakes can be utilized efficiently at this time because of the suspended condition of the wheels. Thus, with the wheels capable of being immediately stopped, reversal of direction may be effectuated.

When it is desired to moor the boat and remove the car therefrom, it is merely necessary that the car be placed in reverse gear at which time the stern portion of the watercraft 10 will back slowly into a condition of adjacency with the mooring ramp 12. As the stern portion 24 approaches the mooring ramp 12, which will be in a down condition determined by the contact of plate 86 with dock support $D_1$, the transverse tie member 64 will ride along the surface 60 provided on the side members 55 and will eventually slide into position in slot 63 and will contact the contoured surface 79 of the pin member 72. As further movement continues, this pin member 72 will be raised against the force of the spring 78 and the tie member 64 will pass the pin to be received in the position of Figure 3. At this time the watercraft 10 is locked in place with respect to the mooring ramp 12 and accordingly, with respect to the dock D.

Here, the previously-described steering and propulsion connections may be disengaged, and at this time, it is merely necessary that the piston 38a be operated to move the link members 36, 37 clockwise of Figure 5, and upon continuation of this movement, the frame member 14 will contact the wheels T, T of the car 13 that have previously been suspended with respect to the deck 26. During the just-described clockwise movement of the members 36, 37, it is believed apparent that the equivalent movement to the right of Figure 5 will occur with respect to the cables 50 and 52 with the result that the pins 49, 49 will be retracted against the force of the springs 50, 50 so as to leave the slot members 48, 48 open whereupon the pins 47, 47 can be removed therefrom upon the continued upward and to the right movement of frame member 14 (Figure 5). When the frame member 14, having the wheels and car thereon, has been moved to the chain-dotted line position of Figure 5 it is merely necessary that the spanning members 82, 83 be moved into place and at this time the car can be backed across the same as well as the surface 80 of ramp 12 and onto the dock, at which time the vessel is free and clear of the automobile received thereon.

In Figure 1, there is shown an additional support between ramp 12 and hull 13 in the form of a bar 140. This bar 140, which may be telescoped under tension, acts to limit the relative pivoting between hull 13 and ramp 12 and thus, under heavy loading conditions the hull 13 and ramp 12 will act in unison as a coplanar unit, other equivalent auxiliary sub-parts would be employed to limit this pivotal movement.

It will be seen from the foregoing that there has been provided a new and novel type of watercraft characterized by the extreme ease with which an automobile can be quickly and efficiently received and dismounted with respect to the hull. It has been shown how an efficient and careful operation results from the fact that the automobile is firmly secured with respect to the hull of the watercraft involved and that the steering and propulsion of the watercraft are effectuated as a result of the component parts provided on the automobile.

It has been further shown how the use of a floating ramp that is pivotally suspended with respect to the dock and hull permits the automobile to be positioned on the hull without excessive lowering of one end of the hull due to such loading.

It is believed apparent that in permanent installations, the loading ramp could be provided with guide rails that projected therefrom from directing the hull accurately into contact with the mooring ramp upon landing.

Similarly, the hull 13 could have the elevated loading deck disposed in the bow or stern portion, or both, to facilitate loading from either end. Also remote or auxiliary controls as well as a hand throttle could be located exteriorly of the car to permit operation of the car from a point outside the same, and additionally, a single propeller could be used by driving off the differential "propeller" unit of the car. Also, it is apparent that the dock D and ramp 12 could be made movable relatively of each other in a vertical direction to accommodate low or high tide, extreme loading conditions, etc.

Other modifications involving change in shape, configuration, composition, or substituting equivalents could be also resorted to without departing from the spirit hereof or the scope of the appended claims.

What is claimed is:

1. A watercraft of the character described, comprising; a hull including a main deck and an elevated deck at one end thereof; a car-receiving frame; means for shifting said frame longitudinally of said hull between positions of substantially coplanar alignment with said main and elevated decks; a plurality of car-supporting standards projecting from said main deck and having their free ends falling in a plane that lies between and is parallel to the plane of said main deck, whereby a car may be transferred between a position of support on said frame and a position of support on said standards upon shifting of said frame and said elevated deck.

2. A watercraft of the character described, comprising; a hull including a main deck and an elevated deck at one end thereof; a car-receiving frame; means for shifting said frame longitudinally of said hull between positions of substantially coplanar alignment with said main and elevated decks; a plurality of car-supporting standards projecting from said main deck and having their free ends falling in a plane that lies between and is parallel to the plane of said main deck, whereby a car may be transferred between a position of support on said frame and a position of support on said standards upon shifting of said frame and said elevated deck; at least two of said standards being arranged longitudinally of said hull in parallelism with said frame.

3. The device of claim 2 further characterized by the fact that said standards are adjustable longitudinally of each other.

4. The device of claim 2 further characterized by the fact that said standards are adjustable longitudinally of each other; said standards having an axle engaging slot therein at their free ends.

5. The device of claim 2 further characterized by the fact that said standards are adjustable longitudinally of each other; said standards having an axle engaging slot therein at their free ends; at least one said slot having a selectively retractable restriction associated therewith.

6. In combination, a plurality of upright support standards, projecting from a planar surface and having their projecting ends arranged in a common plane; a lift rack movable between positions above and below the projecting ends of said standards, said standards having mouth openings adjacent their projecting ends; and means for restricting access to said mouth openings upon shifting of said rack.

7. In combination, a plurality of upright support standards, projecting from a planar surface and having their projecting ends arranged in a common plane; a lift rack movable between positions above and below the projecting ends of said standards, said standards having mouth openings adjacent their projecting ends; and means for restricting access to said mouth openings upon shifting of said rack; said means including a pin, shiftable across said mouth opening; and rope means interconnecting said pin and said rack.

8. The device of claim 2 further characterized by the presence of propulsion means; said propulsion means being capable of actuation upon attachment thereof to a car received on said car-receiving frame when the same is in coplanar alignment with said main deck.

9. The device of claim 2, further characterized by the presence of steering means; said steering means being capable of actuation upon attachment thereof to a car received on said car-receiving frame when the same is in coplanar alignment with said main deck.

10. A car-powered watercraft of the character described, comprising; a hull; a plurality of car supporting elements carried by said hull and having their free ends arranged in a support plane; a car receiving frame; and means for shifting said frame longitudinally of said hull between positions on opposed sides of said support plane whereby a car received on said frame may be suspended on said elements upon movement of said frame through said support plane.

11. A car-powered watercraft of the character described, comprising; a hull having a deck portion, a rudder, and at least one propeller; means for positioning an automobile in association with said deck with the rear axle and wheels thereof elevated above said deck whereby the same can freely rotate; steering means operatively associated between the front wheels of said auto and said rudder; power take-off means extending transversely of said hull and operatively connecting the said elevated and freely rotating wheels with said propeller whereby said propeller will be driven upon rotation of said axle; and opposed support means for elevating said front wheels above said deck; said opposed support means being shiftable in unison longitudinally of said deck and said power take-off means.

References Cited in the file of this patent

UNITED STATES PATENTS

| | | |
|---|---|---|
| 471,202 | Victor | Mar. 22, 1892 |
| 698,573 | Smith | Apr. 29, 1902 |
| 1,627,135 | Ario | May 3, 1927 |
| 1,804,262 | Lewis et al. | May 5, 1931 |
| 1,850,669 | Harvey | Mar. 22, 1932 |
| 2,325,532 | Miller | July 27, 1943 |
| 2,334,932 | Kaloshin | Nov. 23, 1943 |
| 2,365,830 | Miller | Dec. 26, 1944 |
| 2,475,115 | Van Eaton | July 5, 1949 |
| 2,521,368 | Hingerty | Sept. 5, 1950 |
| 2,533,949 | Mans | Dec. 12, 1950 |
| 2,641,785 | Pitts et al. | June 16, 1953 |
| 2,676,817 | White | Apr. 27, 1954 |
| 2,714,735 | Watson | Aug. 9, 1955 |
| 2,803,360 | Midgley et al. | Aug. 20, 1957 |